Aug. 12, 1947.　　　H. HARRIS, JR　　　2,425,317
PREDICTION APPARATUS
Filed July 13, 1943

INVENTOR
HERBERT HARRIS JR.
BY
ATTORNEY.

Patented Aug. 12, 1947

2,425,317

UNITED STATES PATENT OFFICE 2,425,317

PREDICTION APPARATUS

Herbert Harris, Jr., Cedarhurst, N. Y., assignor to Sperry Gyroscope Company, Inc., a corporation of New York Application July 13, 1943, Serial No. 494,479

9 Claims. (Cl. 235—61.5)

This invention relates generally to the art including gun fire control systems, and, more particularly, to novel prediction apparatus especially adapted for use in an anti-aircraft director of the "plan prediction" type.

In such plan prediction anti-aircraft directors the spherical coordinates of the present position of the target, as determined by a suitable sighting device and rangefinder, are converted to the corresponding rectilinear coordinates of the present position of the target. Since the prediction solution of such directors is based upon the assumption of a constant target course and speed, each of the rectilinear coordinates of prediction (target travel distance during projectile time of flight) may be obtained simply by obtaining the rate of change of each of the rectilinear coordinates and multiplying these rates of change by the time of flight. The future position of the target in any coordinate is then obtained by adding the corresponding coordinate of the present position of the target to the corresponding coordinate of prediction. Thus, the solution for the predicted position ($X_p$) may be expressed by the formula $$X_p = X_0 + \dot{X}_0 t_p$$

wherein X may represent any rectilinear coordinate, the subscripts 0 and p represent present and predicted target positions, respectively, and $t_p$ represents the projectile time of flight. If the target is travelling at a constant speed, the true present position of the target $X_0$ will vary with time according to the following expression $$X_0 = a_0 + a_1 t$$

wherein $a_0$ represents the X coordinate of target position at zero time and $a_1$ represents the constant speed of the target in the X direction for the elapsed time $t$. Inserting this value of $X_0$ in the expression for $X_p$, the following expression for the true future position of the target $X_p$ will be obtained $$X_p = a_0 + a_1 t + a_1 t_p$$

The simple solution for the future position of the target described above is complicated in practice by virtue of the fact that although the target is flying at a constant speed in a constant direction, the actual present position input data which is introduced into the prediction apparatus always has a certain amount of erratic and spurious perturbations superimposed upon the true value represented thereby. These variations are caused by the inability of the operators to track the target with the sighting device absolutely accurately, by backlash in the gearing and in the coordinate conversion mechanism, etc. For purposes of analyzing the effect of these perturbations, it can be assumed that they consist of sinusoidal oscillations of some maximum magnitude $\delta$ having some frequency $$\frac{\omega}{2\pi}$$

Thus, the actual present position input data introduced into the prediction apparatus can be represented by the expression $$X_0 = a_0 + a_1 t + \delta e^{j\omega t}$$

wherein the first two terms represent the true present position of the target, and the last term represents the spurious variations in the data. Should this input data then be differentiated in a pure mathematical differentiating device, the derivative multiplied by time of flight $t_p$, and the resulting product added to the present position input data in order to obtain the future position $X_p$, the following value of $X_p$ will be obtained:

$$X_p = a_0 + a_1 t + a_1 t_p + \delta(1 + j\omega t_p) e^{j\omega t}$$

It will be seen from the above expression for $X_p$ that the first three terms represent the true future position desired, whereas the last term is a superimposed sinusoidal oscillation which has been reflected from the sinusoidal oscillations superimposed upon the present position input data. Moreover, the resulting oscillation reflected into the future position output data has been magnified by the quantity $(1+j\omega t_p)$. This magnification, which will hereafter be referred to as the amplitude ratio, will be seen to equal 1 when $\omega t_p$ equals 0, and to approach infinity as $\omega t_p$ approaches infinity. With typical values of $\omega$ and $t_p$ (for example, $\omega=3$ and $t_p=20$) inserted in the expression for the amplitude ratio, a value of approximately 60 is obtained for this amplitude ratio. Accordingly, should a true differentiation be performed upon the actual present position input data in order to solve for the future position of the target, the spurious perturbations superimposed upon the input data will be reflected into the output data in magnified form, the amount of magnification being ordinarily of the order of 60.

With the apparatus of the present invention, a certain amount of smoothing, or averaging, is performed simultaneously with the process of differentiation in order to reduce as much as possible the effect of erratic variations in the input data, and to thereby maintain the amplitude ratio at a much lower value. As will later be shown, the amplitude ratio for the prediction circuit of the present invention varies only between the limits of 1 and 2, thus representing a great improvement over prior systems in the accuracy of the output future position data.

In the prediction circuit of most presently used anti-aircraft directors a disc, ball carriage, and cylinder variable speed device, operating in conjunction with an equating differential, is employed for the purpose of performing the differentiation of the input data in the manner disclosed in U. S. Patent No. 2,206,875 for Fire control device, issued July 9, 1940, in the names of E. W. Chafee and B. A. Wittkuhns. In such systems the output shaft, the angular displacement of which represents the future position of the target, is driven in part from the cylinder of the variable speed device and in part from the present position input shaft. As is well known, the torque output of such a variable speed device is limited by the friction existing between the disc, ball carriage, and cylinder. Accordingly, the output future position shaft may only exert a limited amount of torque upon other apparatus of the director, and this limitation must be taken into account in the design of the overall director.

In the present invention a novel electro-mechanical differentiating device is employed in place of the disc, ball carriage, and cylinder variable speed device of prior prediction apparatus. The future position output shaft in the present invention is driven almost wholly from an electrical motor, and, accordingly, may exert an unlimited amount of torque upon the apparatus into which it is connected. This larger amount of torque on the future position output shaft leaves the designer of the director free to make other desirable changes in the remaining portions of the director apparatus which changes are impossible with the smaller amount of torque on the future position output shaft of prior prediction circuits.

Accordingly, one object of the present invention is to provide novel prediction apparatus for antiaircraft directors wherein the future position output shaft is capable of exerting large torques.

Another object of the invention is to provide prediction apparatus wherein erratic variations on the present position input data are smoothed, or averaged, out to a very large extent.

Still another object of the invention is to provide smoothing and predicting apparatus wherein the amplitude ratio between the spurious perturbations appearing in the output data and those appearing in the input data varies only between the values of 1 and 2.

Yet another object of the invention is to provide smoothing and predicting apparatus wherein the amplitude ratio is of the order of 2 under conditions ordinarily met in practice.

Other objects and advantages will become apparent from the specification, taken in connection with the accompanying drawings wherein the invention is embodied in concrete form.

In the drawings.

Similar characters of reference are used in both of the above figures to indicate corresponding parts. Arrows are employed to indicate the direction of flow of information or control influences.

Figure 1:
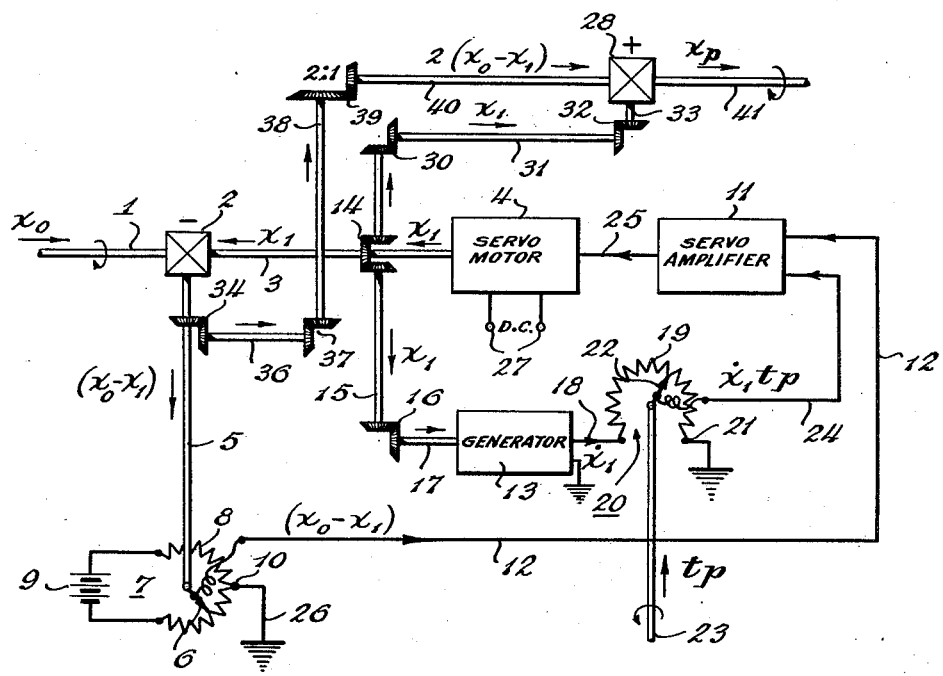
Fig. 1 is a schematic representation and wiring diagram of the prediction apparatus of the present invention.

Referring now to Fig. 1, the reference numeral 1 is applied to the present position input shaft which is actuated from other portions of the director (not shown) so as to continuously have a displacement proportional in amount and corresponding in sense to one coordinate $X_0$ of the present position of the target. Shaft 1 is shown as actuating one input member of a subtracting, or equating, differential 2, the other input member of which is actuated from shaft 3 driven from servo motor 4 in a manner which will later be described. The amount and direction of the angular displacement of shaft 3 is represented by the algebraic quantity $X_1$, the relation of which with respect to $X_0$ will later be brought out. Output member of differential 2 actuates shaft 5, the angular displacement of which may therefore be represented by the quantity $(X_0-X_1)$ since its angular displacement will always be equal to the algebraic difference in displacements of shafts 1 and 3.

Shaft 5 actuates a movable contact arm 6 of a potentiometer unit 7 in such a manner that when the angular displacement of shaft 5 is zero, contact arm 6 lies at mid-point 10 of the linearly wound resistive winding 8 of the potentiometer unit. The opposing terminals of the resistive winding 8 are connected to a constant source of direct voltage, indicated as a battery 9. Mid-point 10 is connected to ground as by lead 26. Output lead 12 is electrically connected to contact arm 6, and thus picks off the voltage existing at the point of contact between contact arm 6 and winding 8. Since a constant current will flow through both halves of winding 8, it will be seen that the voltage appearing on lead 12 will have a polarity and a magnitude corresponding to the displacement of contact arm 6 from point 10. This voltage will therefore correspond to the angular displacement of shaft 5 and may also be represented by the quantity $(X_0-X_1)$. The voltage appearing on lead 12 is then applied as one input to the servo amplifier 11, the output of which is connected by leads 25 to control the servo motor 4.

Shaft 3, which is driven by servo motor 4, is connected through gearing 14, shaft 15, gearing 16, and shaft 17 to drive a permanent magnet generator 13. As is well known, the output voltage of such a generator corresponds in magnitude and polarity to the magnitude and sense of the velocity at which it is driven. Accordingly, the voltage appearing on output lead 18, being proportional to the time derivative of the quantity $X_1$, may be represented by the quantity $\dot{X}_1$.

The voltage appearing on lead 18 is applied to one terminal of a linearly wound resistive winding 19 of a potentiometer unit 20, the other terminal of which winding is grounded, as at 21. A movable contact arm 22 is driven from an input shaft 23, which is displaced by other portions of the director (not shown) by an amount corresponding to the projectile time of flight $t_p$. Electrically connected to contact arm 22 is a lead 24 which introduces a second input signal voltage into the servo amplifier 11. The second input signal will obviously be proportional to the voltage applied to resistor winding 19, and also proportional to the angular displacement of shaft 23, and may therefore be represented by the quantity $\dot{X}_1 t_p$.

Servo amplifier 11 operates, in effect, to subtract the input voltage appearing on lead 12 from that appearing on lead 24, and to amplify the resulting difference voltage. This amplified difference voltage is introduced as by appropriate leads in a cable 25 across the field windings of servo motor 4 so as to provide a field flux having a magnitude and sense corresponding to the magnitude and polarity of the difference voltage. The armature of servo motor 4 is constantly energized from any suitable constant source of direct voltage applied to terminals 27. Accordingly, servo motor 4 actuates shaft 3 at a rate and in a direction determined by the magnitude and polarity of the difference in the voltage signals existing on leads 12 and 24.

An additive differential 28 is provided which has one input member driven in accordance with the quantity $X_1$ from shaft 3 through gearing 14, shaft 29, gearing 30, shaft 31, gearing 32, and shaft 33. A second input member of differential 28 is actuated by an amount corresponding to twice the quantity $(X_0-X_1)$ from shaft 5 through gearing 34, shaft 36, gearing 37, shaft 38, gearing 39, and shaft 40. The two-to-one ratio may be obtained at any of the gearing and is indicated at gearing 39. Accordingly, output shaft 41 of differential 28 is driven by an amount corresponding to the algebraic sum of the quantities $X_1$ and $2(X_0-X_1)$. As will later be shown, this sum corresponds to the future position of the target $X_p$, and therefore the angular displacement of shaft 41 represents the future position of the target $X_p$. This displacement may then be introduced into other portions of the director to be used as desired.

Figure 2:
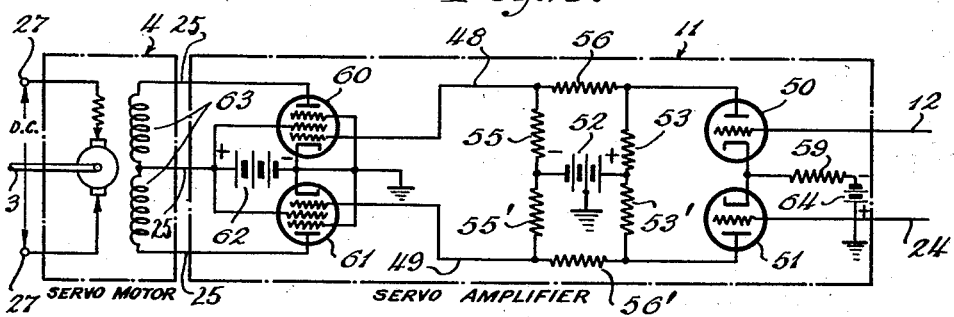
Fig. 2 is a wiring diagram illustrating a servo amplifier and servo motor suitable for use in the apparatus of Fig. 1.

Referring now to Fig. 2, wherein a suitable servo amplifier 11 and servo motor 4 are shown, input leads 12 and 24 are shown connected to the respective grids of triodes 50 and 51. A common plate supply battery 52 has its positive terminal connected to the plates of tubes 50 and 51 through equal resistors 53 and 53', respectively. A closed resistive circuit consisting of battery 52, and resistors 55, 56, and 53, is associated with tube 50, and a similar closed circuit, consisting of the battery and resistors 55', 56' and 53', is associated with tube 51. Battery 52 is grounded at a point intermediate its opposing terminals. The filaments of tubes 50 and 51 are connected to the negative terminal of a battery 64 through the common biasing resistor 59. The positive terminal of battery 64 is grounded, as shown.

The circuit constants of the circuit just described are chosen such that equal plate currents flow in both tubes under quiescent conditions, that is, with zero signal voltages impressed upon the grids from input leads 12 and 24. Under such conditions, since equal plate currents will be flowing in opposite directions through resistors 53 and 53', the voltage appearing across the opposite terminals of these resistors will be zero, and the voltage appearing across output leads 48, 49 will be zero. Similarly, if identical signal voltages are received upon leads 12 and 24, since the plate currents of each tube will be affected equally, equal currents will still flow in opposite directions through resistors 53 and 53', and the output voltage across leads 48, 49 will still be zero. However, if the signal voltages impressed upon the grids should differ, then more or less current will flow through resistor 53 than through resistor 53', depending upon whether the voltage received on lead 12 is more positive or more negative than that received on lead 24. Accordingly, the voltage across output leads 48 and 49 will correspond in polarity and magnitude to the algebraic difference of the two voltage signals received on leads 12 and 24.

To further amplify this difference voltage, two high impedance current sources, such as pentodes 60 and 61, are provided having their control grids respectively connected to leads 48 and 49, and each having their filaments and suppressor grids connected to ground. The electron current of tube 60 flows from the negative side of a plate supply battery 62 through the tube, and through the upper half of field winding 63 of servo motor 4 back to the positive side of the battery. Similarly, the electron current of tube 61 flows through the plate supply battery, tube 61 and then returns to the battery through the lower half of field winding 63, thus setting up a field flux tending to oppose that generated by the plate current of tube 60. The screen grids of both tubes may be connected to the positive terminal of battery 62 in the usual manner.

It will be apparent that the amplifying circuit including pentodes 60, 61 will operate in a manner similar to that of tubes 50, 51 to produce current flow in opposite directions through the two halves of field winding 63 of motor 4, the current flow in the upper half being proportional to the voltage appearing on lead 48, and the current flow in the lower half being proportional to the voltage appearing on lead 49. Accordingly, a field flux will be set up in motor 63 of a magnitude and sense corresponding to the algebraic difference between the voltages appearing on input leads 12 and 24. Since a constant direct voltage is applied to armature terminals 27 of motor 4, the motor will therefore drive shaft 3 at a rate and in a direction determined by the algebraic difference between the voltages appearing on input leads 12 and 24. It will be understood that the invention is not limited to the particular type of amplifying circuit and servo motor shown and described, but that any suitable type adapted to accomplish the above-described purpose could be employed.

Referring again to Fig. 1, in order to consider the theory of operation of the apparatus there shown in producing an angular displacement of output shaft 41 proportional to the future position of the target $X_p$, it can be assumed that initially the displacements of shafts 1, 3 and 5 are all zero. Now if the operator begins to track a target having a constant speed and course, input shaft 1 will be caused to rotate at a constant speed in accordance with the rate of change in the X coordinate of the target's position. Since shaft 3 is still stationary at this time, shaft 1 will immediately displace shaft 5, causing a voltage signal to appear on lead 12. The difference between this voltage signal and that appearing on lead 24, which latter signal is now zero since shaft 3 is not as yet rotating, will serve to generate a corresponding field flux in servo motor 4, thereby causing it to begin to drive shaft 3 at a rate which may for the present be considered constant and less than that of shaft 1. This resulting rate of displacement of shaft 3 will operate through the generator 13 and potentiometer unit 20 to produce a corresponding voltage signal on lead 24 which will tend to oppose that on lead 12. However, if the rate of rotation of shaft 3 is still less than that of shaft 1, the displacement of shaft 5 will continue to increase, resulting in an increase in the voltage signal appearing on lead 12, whereas the signal on lead 24 remains constant for constant rate on shaft 3. The corresponding increase in the difference of the voltages on leads 12 and 24 will operate through the servo amplifier 11 and servo motor 4 to again increase the rate of rotation of shaft 3.

It will be apparent that unless, and until, the rate of rotation of shaft 3 is equal to that of shaft 1, an ever-increasing voltage difference signal will be produced, amplified, and applied to the field winding of motor 4, thereby causing a further increase in the rate of rotation of shaft 3. There will thus be set up a continuous process tending to increase the speed of motor 4 and shaft 3 until it is equal to that of shaft 1, at which time no further displacement of shaft 5 will take place and the voltage signal appearing on lead 12 will become constant. At this time the voltage signal appearing on lead 24 will also have become constant, since the rate of rotation of shaft 3 has become constant and equal to that of shaft 1.

At this condition of equilibrium the difference between the voltages appearing on leads 12 and 24 will be just sufficient to provide the proper field flux to cause shaft 3 to rotate at exactly the same speed as shaft 1. By designing the servo amplifier 11 so as to have a very large amplification factor, the actual difference between the voltages on leads 12 and 24 required to equate the rates of rotation of shafts 1 and 3 may be made so small as to be negligible.

Since, under the conditions of equilibrium, shafts 3 and 1 are rotating at the same rate, the voltage appearing on lead 24 may be taken as representing prediction since this voltage is then equal to the rate of change of the X coordinate appearing on shaft 1 multiplied by the time of flight $t_p$. Also, since the difference between the voltage appearing on leads 12 and 24 is negligible due to the high amplification factor of amplifier 11, we may say that the voltage appearing on lead 12 also represents prediction, and that therefore the displacement of shaft 5, being proportional to the voltage on lead 12, represents prediction.

Obviously, the angular displacement of shaft 5 will also represent the actual displacement lag between shaft 1 and shaft 3 by virtue of the inter-connection of these shafts in differential 2. Accordingly, by adding to the displacement of shaft 3 the angular displacement of shaft 5, the lag in shaft 3 could be eliminated, and the resulting displacement would represent the present position of the target as represented by the displacement of shaft 1. By again adding to this sum the displacement of shaft 5, we could thereby add prediction to the present position and obtain the future position of the target. These two additions are accomplished by virtue of the differential 28 and the two-to-one ratio gearing 39. Thus shaft 41 may be said to have an angular displacement proportional to the predicted future position of the target.

In order to determine the amplitude ratio between erratic variations superimposed on the output future position shaft 41 and those appearing on the input present position input shaft 1, a more rigorous mathematical analysis of the apparatus is necessary. As before, it can be assumed that the angular displacement of shaft 1 varies with respect to time in accordance with the following formula $$X_0 = a_0 + a_1 t + \delta e^{j\omega t} \quad (1)$$

wherein the first two terms represent the true present position of the target and the last term represents a superimposed undesired sinusoidal oscillation. This undesired oscillation of shaft 1 will set up a corresponding oscillation of an unknown amplitude $\Delta$ on the angular displacement of shaft 3. Accordingly, we may express the angular displacement of shaft 3 as follows $$X_1 = b_0 + b_1 t + \Delta e^{j\omega t} \quad (2)$$

wherein $b_0$ represents the initial displacement of shaft 3 and $b_1$ represents the constant rate of displacement thereof.

From the previously described operation of the servo system, we may set up the following relationship of the voltages appearing on leads 12 and 24

$$X_0 - X_1 - \dot{X}_1 t_p = 0 \quad (3)$$

Substituting the values of $X_0$, $X_1$ and $\dot{X}_1$ from Equations 1 and 2 into Equation 3, we obtain $$a_0 + a_1 t + \delta e^{j\omega t} = b_0 + b_1 t + \Delta e^{j\omega t} + b_1 t_p + j\omega t_p \Delta e^{j\omega t} \quad (4)$$

It will be evident that in Equation 4 we can equate the constants, the $t$ coefficients, and the $e^{j\omega t}$ coefficients, resulting in the following expressions, respectively, $$a_0 = b_0 + b_1 t_p \quad (5)$$
$$a_1 = b_1 \quad (6)$$
$$\delta = \Delta + j\omega t_p \Delta \quad (7)$$

Solving Equation 7 for $\Delta$, we obtain $$\Delta = \frac{\delta}{1 + j\omega t_p} \quad (8)$$

and eliminating $b_1$ from Equations 5 and 6, we obtain $$b_0 = a_0 - a_1 t_p \quad (9)$$

Substituting the values of $b_0$ (Equation 9), $b_1$ (Equation 6), and $\Delta$ (Equation 8) in Equation 2, the following expression for $X_1$ is obtained $$X_1 = a_0 + a_1(t - t_p) + \frac{\delta}{1 + j\omega t_p} e^{j\omega t} \quad (10)$$

The value of the quantity $(X_0 - X_1)$ may now be obtained by subtracting Equation 10 from Equation 1, as follows $$X_0 - X_1 = a_1 t_p + \delta e^{j\omega t} - \frac{\delta}{1 + j\omega t_p} e^{j\omega t} \quad (11)$$

From a consideration of differential 28, we may set up the following expression relating $X_p$, $X_1$, and the quantity $(X_0 - X_1)$ $$X_p = X_1 + 2(X_0 - X_1) \quad (12)$$

Substituting the values of $X_1$ from Equation 10 and $X_0 - X_1$ from Equation 11 in Equation 12, an expression for $X_p$ is obtained as follows $$X_p = a_0 + a_1 t + a_1 t_p + \left[ \delta \frac{(1 + 2j\omega t_p)}{1 + j\omega t_p} \right] e^{j\omega t} \quad (13)$$

A consideration of Equation 13 will show that the first three terms of the equation represent the true future position, since the first two terms represent the true present position and the third term represents the true prediction which is equal to the product of time of flight and the true rate of change $a_1$ of the present position. The last term of Equation 13 represents the sinusoidal oscillations superimposed upon the displacement of shaft 41 due to the undesired oscillation superimposed upon the displacement of shaft 1.

The amplitude ratio of the oscillations superimposed upon the future position data and those superimposed upon the present position data may be obtained by dividing the last term of Equation 13 by the last term of Equation 1. Performing this division, we obtain the following expression for amplitude ratio $$A.R. = \frac{1+2j\omega t_p}{1+j\omega t_p} \quad (14)$$

From a consideration of Equation 14 it will be seen that when $\omega t_p$ is equal to 0, the amplitude ratio equals 1, and as $\omega t_p$ approaches infinity, the amplitude ratio approaches 2. When the typical values of $\omega=3$ and $t_p=20$ are inserted in Equation 14, the amplitude ratio comes out to be approximately 2.

It will be seen therefore that the apparatus of the present invention to a large extent overlooks the undesired perturbations appearing on the input data in performing the necessary differentiation of that data. The result is that a much smoother and more accurate solution for the future position $X_p$ is obtained as a proportional displacement of shaft 41 than would be obtained were a pure mathematical differentiation able to be performed, or than is obtained in prior art devices. It will also be seen that the major portion of the displacement of shaft 41 is obtained from the servo motor 4, and that therefore shaft 41 is capable of exerting large amounts of torque upon other portions of the director which it is desired to actuate therefrom.

Although a direct current servo motor, servo amplifier and servo signal system have been shown in the drawing and described in the specification, it will be understood that the invention is not to be limited to a direct voltage system, but that alternating current could be used as well throughout. Also, although the invention has been described as employed in a "plan prediction" type of gun director wherein prediction is performed in rectilinear coordinates, it will be seen that the treatment of the coordinate X has been perfectly general and has in no way been limited by the theory to a rectangular coordinate. Accordingly, the X coordinate could be considered as an angular coordinate, if desired, in which case the invention would represent an "angular rate" type of prediction apparatus.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an apparatus for fire control systems wherein a first shaft is continuously displaced in accordance with one coordinate of the present position of a target and a second shaft is continuously displaced in accordance with the projectile time of flight, a prediction mechanism wherein spurious oscillations of the first shaft are smoothed out comprising an electric motor, a third shaft adapted to be rotated by the motor at a speed and in a direction determined by the magnitude and polarity of the voltage applied to a winding thereof, means jointly actuated by the first and third shafts for obtaining a first voltage signal proportional to their relative displacements, means for generating a second voltage signal proportional to prediction actuated by third shaft and further controlled by the displacement of said second shaft, electronic means responsive to said voltage signals for obtaining a third voltage signal corresponding to the difference in said first and second voltage signals but having an amplified magnitude, and means for applying said third voltage signal to the said winding of said motor.

2. A prediction device, comprising a shaft continuously displaced in accordance with one coordinate of the present position of a target, a differential having one input displaced thereby, a servo motor for operating a second input of the differential, a generator driven from the output of the servo motor adapted to provide an output voltage proportional to the rate of the second input, a potentiometer displaced in accordance with time of flight in circuit with the output of the generator for multiplying the output voltage thereof in accordance with time of flight, a differential amplifier for controlling the servo motor having one input energized by the output of the potentiometer, an output for the differential, means controlled thereby for providing a voltage proportional to the displacement thereof, a second input for the amplifier controlled by the last-mentioned voltage, the amplifier output being such as to drive the servo motor in such direction and rate as to tend to maintain the second input of the differential in equilibrium with the first-mentioned shaft, whereupon the displacement of the output of the differential is proportional to prediction.

3. A prediction device according to claim 2 comprising adding means jointly actuated from the output of the differential and the second input thereof, the output of the adding means being proportional to a coordinate of the future position of the target.

4. A prediction device according to claim 2 comprising a second differential, means controlled by the output of the first-mentioned differential for displacing one input of the second differential, means controlled by the output of the servo motor for displacing a second input of the second differential, the arrangement being such that the output of the second differential is proportional to a coordinate of the future position of the target.

5. A prediction device having an input shaft displaced in accordance with one coordinate of the present position of a target, a differential having one input displaced by the shaft, a servo motor for driving a second input for the differential, means for controlling the servo tending to maintain the rate and direction of the second input in equilibrium with the first, comprising a time of flight member, a source of potential jointly controlled according to the output of the servo motor and by the time of flight member for producing a voltage proportional to a component of prediction, a source of voltage controlled by the output of the differential, amplifier means controlled differentially by the voltages from both sources for driving the servo motor, and output means controlled in proportion to prediction by the output of the servo motor.

6. Means for utilizing a servo motor as a variable speed device in connection with an equating differential of a fire control device to provide a high torque output displacement in proportion to prediction, which comprises an equating differential having a first input displaced continuously in accordance with one coordinate of the present position of the target, a second input for the differential, a servo motor for driving the second input, circuit means for so controlling the rate and direction of the servo motor as to maintain the input displacements of the differential in equilibrium comprising a differential amplifier, means controlled by the output of the differential for providing a proportional voltage to one input terminal of the amplifier, a time of flight member, a source of voltage jointly controlled by the second input of the differential and the time of flight member connected to a second input terminal of the amplifier which voltage is proportional to prediction, and an output shaft coupled with the second input for the differential displaced according to prediction.

7. Means for utilizing a servo motor as a variable speed drive in connection with an equating differential of a fire control device to provide a high torque output displacement in proportion to prediction, which comprises an equating differential having a first input displaced continuously in accordance with one coordinate of the present position of the target, a second input for the differential, a servo motor for driving the second input, circuit means for so controlling the rate and direction of the servo motor as to maintain the displacements of both inputs of the differential in equilibrium comprising a differential amplifier, means controlled by the output of the differential for providing a voltage proportional to the displacement thereof to one input terminal of the amplifier, a time of flight member, a source of voltage controlled by the second input of the differential according to the rate thereof and by the time of flight member, the source being connected to a second input terminal of the amplifier, which voltage is proportional to prediction, a shaft coupled with the second input to the differential, which is displaced according to prediction, and means for modifying the displacement of the last-mentioned shaft according to present position of the target to obtain a displacement in accordance with the predicted position thereof.

8. Means for utilizing a servo motor as a variable speed drive in connection with an equating differential in a fire control device to provide a high torque output displacement in proportion to prediction which comprises an equating differential having a first input displaced continuously in accordance with one coordinate of the present position of the target, a second input for the differential, a servo motor for driving the second input, circuit means for controlling the rate and direction of the servo motor tending to maintain the displacements of the second input in equilibrium with the first comprising a differential amplifier having its output connected with the input of the servo motor, potentiometer means controlled by the output of the differential for providing a voltage proportional to the displacement thereof to one input terminal of the differential amplifier, a time of flight member, a source of voltage controlled by the second input to the differential according to the rate thereof, means comprising a potentiometer connected to the source and actuated by the time of flight member for producing a voltage proportional to prediction which voltage is connected to a second input terminal of the amplifier, and a second differential having output means displaced according to the predicted position of the target having one input displaced from the output of the first-mentioned differential and a second input displaced by the servo motor.

9. A prediction arrangement according to claim 8 in which the displacement of the output of the first-mentioned differential is proportional to one-half the present position of the target coordinate as represented by the displacement of the first input of said differential, and shaft and gear means having a 2:1 ratio coupled thereto for displacing the input of the second differential according to the coordinate of the present position of the target.

HERBERT HARRIS, JR.

REFERENCES CITED

The following references are of record in the file of this patent:

UNITED STATES PATENTS

| Number | Name | Date |
|---|---|---|
| 2,113,436 | Williams | Apr. 15, 1938 |
| 2,115,086 | Riggs | Apr. 26, 1938 |

Certificate of Correction

Patent No. 2,425,317.   August 12, 1947.

HERBERT HARRIS, Jr.

It is hereby certified that errors appear in the printed specification of the above numbered patent requiring correction as follows: Column 4, line 55, for "$X_1$" second occurrence, read $\dot{X}_1$; column 8, line 47, strike out the equal sign (=) second occurrence, and insert instead a minus sign (−); column 9, line 5, for "$1+\text{jwt}^p$" read $1+jwt_p$; and that the said Letters Patent should be read with these corrections therein that the same may conform to the record of the case in the Patent Office.

Signed and sealed this 25th day of November, A. D. 1947.

[SEAL]

THOMAS F. MURPHY,
*Assistant Commissioner of Patents.*